(12) United States Patent
Zhao et al.

(10) Patent No.: US 11,024,976 B2
(45) Date of Patent: Jun. 1, 2021

(54) MOBILE TERMINAL

(71) Applicant: AAC Technologies Pte. Ltd., Singapore (SG)

(72) Inventors: Wei Zhao, Shenzhen (CN); Zhimin Zhu, Shenzhen (CN); Zhengdong Yong, Shenzhen (CN); Xiaoyue Xia, Shenzhen (CN); Chao Wang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 58 days.

(21) Appl. No.: 16/702,475

(22) Filed: Dec. 3, 2019

(65) Prior Publication Data

US 2020/0212583 A1   Jul. 2, 2020

(30) Foreign Application Priority Data

Dec. 28, 2018   (CN) .......................... 201811627448.0

(51) Int. Cl.
| | | |
|---|---|---|
| *H01Q 13/08* | (2006.01) | |
| *H01Q 1/24* | (2006.01) | |
| *H01Q 13/20* | (2006.01) | |
| *H01Q 9/04* | (2006.01) | |
| *H01Q 1/42* | (2006.01) | |
| *H04M 1/02* | (2006.01) | |

(52) U.S. Cl.
CPC .......... *H01Q 13/085* (2013.01); *H01Q 1/243* (2013.01); *H01Q 1/422* (2013.01); *H01Q 9/0421* (2013.01); *H01Q 13/206* (2013.01); *H04M 1/0266* (2013.01)

(58) Field of Classification Search
CPC .... H01Q 13/08; H01Q 13/085; H01Q 13/206; H01Q 9/0421; H01Q 1/24; H01Q 1/243; H01Q 1/422
See application file for complete search history.

(56) References Cited

U.S. PATENT DOCUMENTS

2017/0294705 A1* 10/2017 Khripkov ............... H01Q 21/24
2018/0062256 A1*  3/2018 Kim ....................... H01Q 13/02

* cited by examiner

*Primary Examiner* — Hoang V Nguyen
(74) *Attorney, Agent, or Firm* — W&G Law Group LLP

(57) ABSTRACT

The present invention provides a mobile terminal, which includes a Vivaldi antenna system arranged in the mobile terminal, wherein the Vivaldi antenna system includes two pairs of Vivaldi antenna arrays, opening directions of one pair of the Vivaldi antenna arrays are along a length direction of the mobile terminal, opening directions of the other pair of the Vivaldi antenna arrays are along a thickness direction of the mobile terminal, and each pair of the Vivaldi antenna arrays includes two Vivaldi antenna arrays with opposite opening directions, and the Vivaldi antenna arrays operate in a frequency band of 5G millimeter waves. Compared with the related art, the mobile terminal provided by the present disclosure has wide and uniform beam bandwidths in a non-scanning direction, thus achieving excellent spatial coverage efficiency.

8 Claims, 12 Drawing Sheets

Theta/°

Phi/°

Theta/°

Phi/°

MOBILE TERMINAL

TECHNICAL FIELD

The present disclosure relates to an antenna, and more particularly, to a mobile terminal applied to the field of communication electronics.

BACKGROUND

As the focus of research and development in the global industry, developing 5G technologies and formulating 5G standards have become the consensus of the industry. At the $22^{nd}$ ITU-RWP5D meeting held in June 2015, the International Telecommunication Union ITU defined three main application scenarios of 5G: Enhanced Mobile Broadband, Massive Machine Type Communications, and Ultra Reliable Low Latency Communications. The three application scenarios respectively correspond to different key indicators, of which a peak user speed in the Enhanced Mobile Broadband scenario is 20 Gbps and a lowest user experience rate is 100 Mbps. The unique characteristics of high carrier frequency and large bandwidth of millimeter waves are the main means to realize an ultra-high data transmission rate of 5G.

Abundant bandwidth resources of the frequency bands of millimeter waves provide guarantee for high-speed transmission rate. However, due to severe space loss of electromagnetic waves in the frequency band, a wireless communication system using the frequency band of millimeter waves needs to adopt a phased array architecture. Phases of each array element are distributed according to a certain rule through a phase shifter, thereby forming high-gain beams, and the beams are scanned in a certain spatial range through phase shift changes.

5G millimeter waves require frequency bands of 28 GHz and 39 GHz, while a frequency band of the millimeter waves of WIFI in the future will reach 60 GHz, which is difficult to realize by a common broadband antenna. However, Vivaldi can cover the above frequency bands and meet the bandwidth requirements. Vivaldi is an excellent millimeter wave antenna solution for mobile phones.

BRIEF DESCRIPTION OF THE DRAWINGS

In order to illustrate the technical solutions in the embodiments of the present disclosure more clearly, the drawings used in the description of the embodiments will be briefly described below. Obviously, the drawings in the following description are merely some embodiments of the present disclosure. For those of ordinary skill in the art, other drawings may also be obtained based on these drawings without any creative work, wherein.

DETAILED DESCRIPTION

Figure 1:
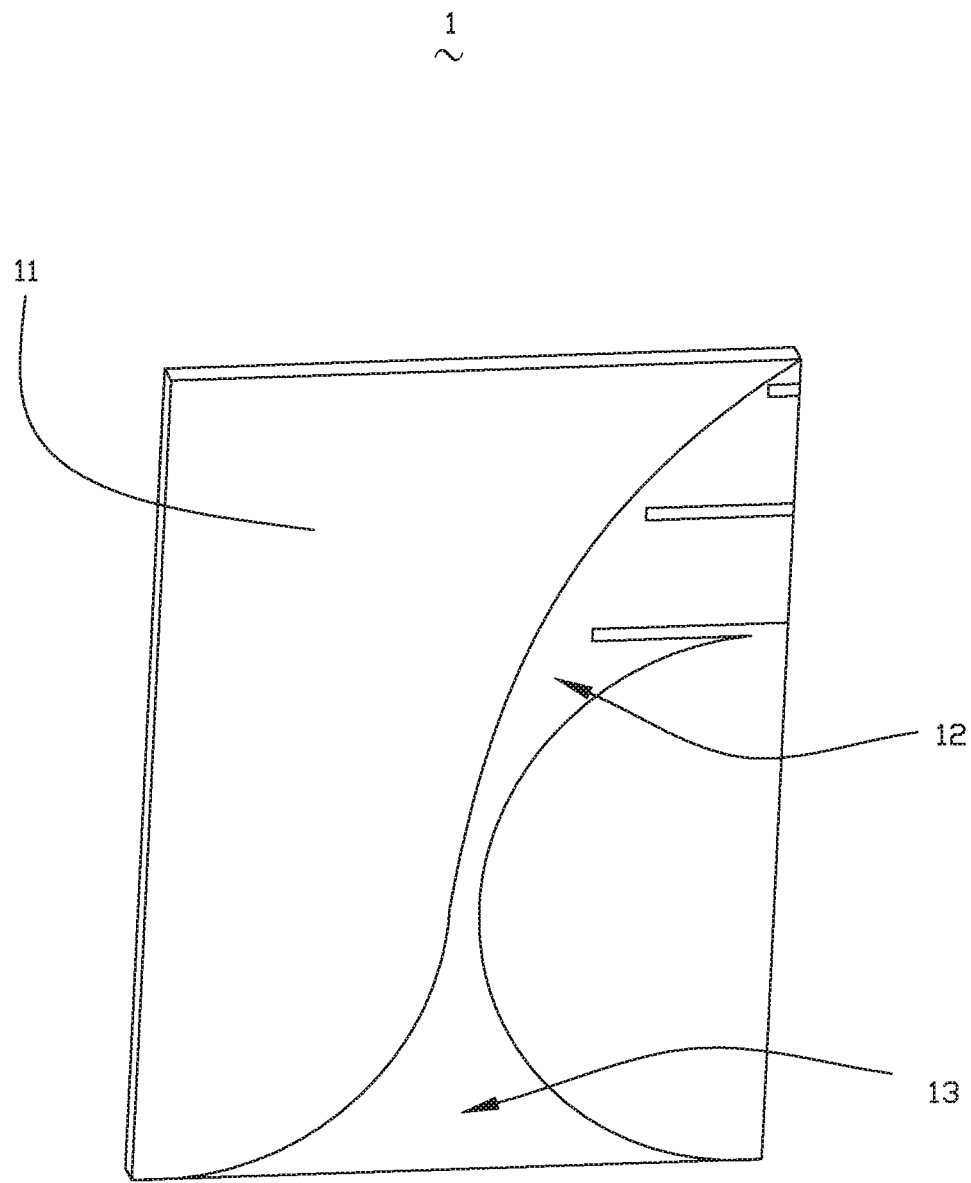
FIG. 1 is a perspective view showing the structure of a Vivaldi antenna provided by the present disclosure from one angle.
Figure 2:
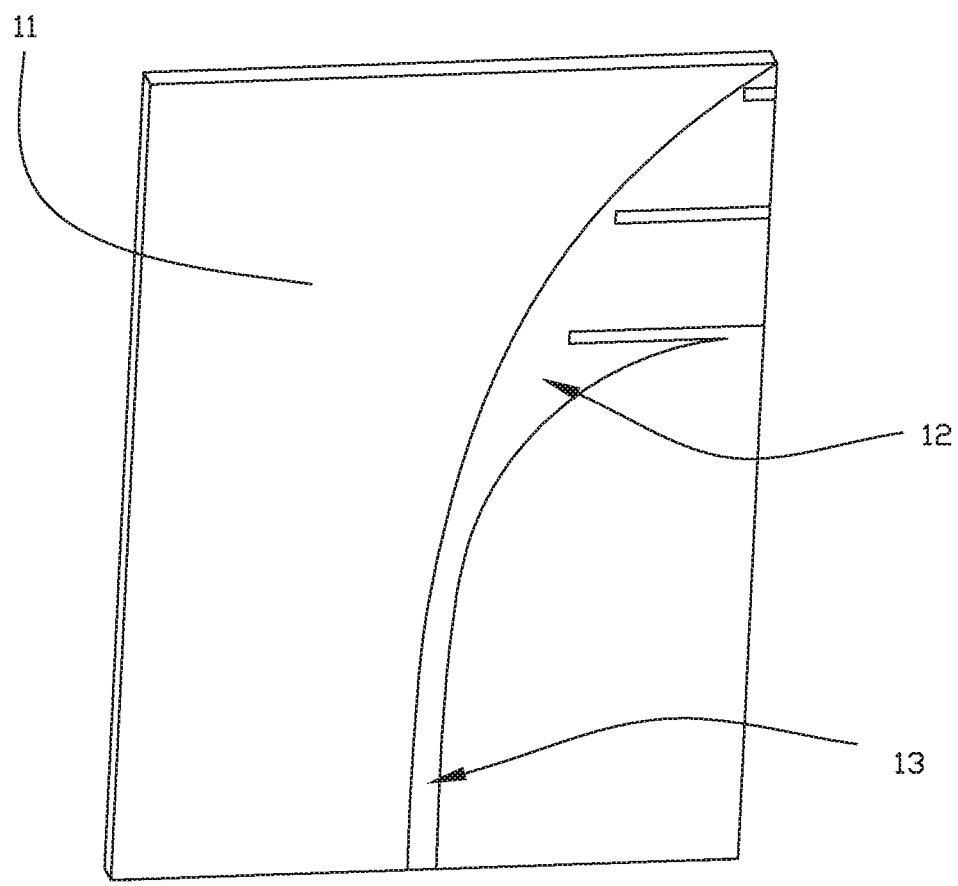
FIG. 2 is a perspective view showing the structure of the Vivaldi antenna provided by the present disclosure from another angle.
Figure 3:
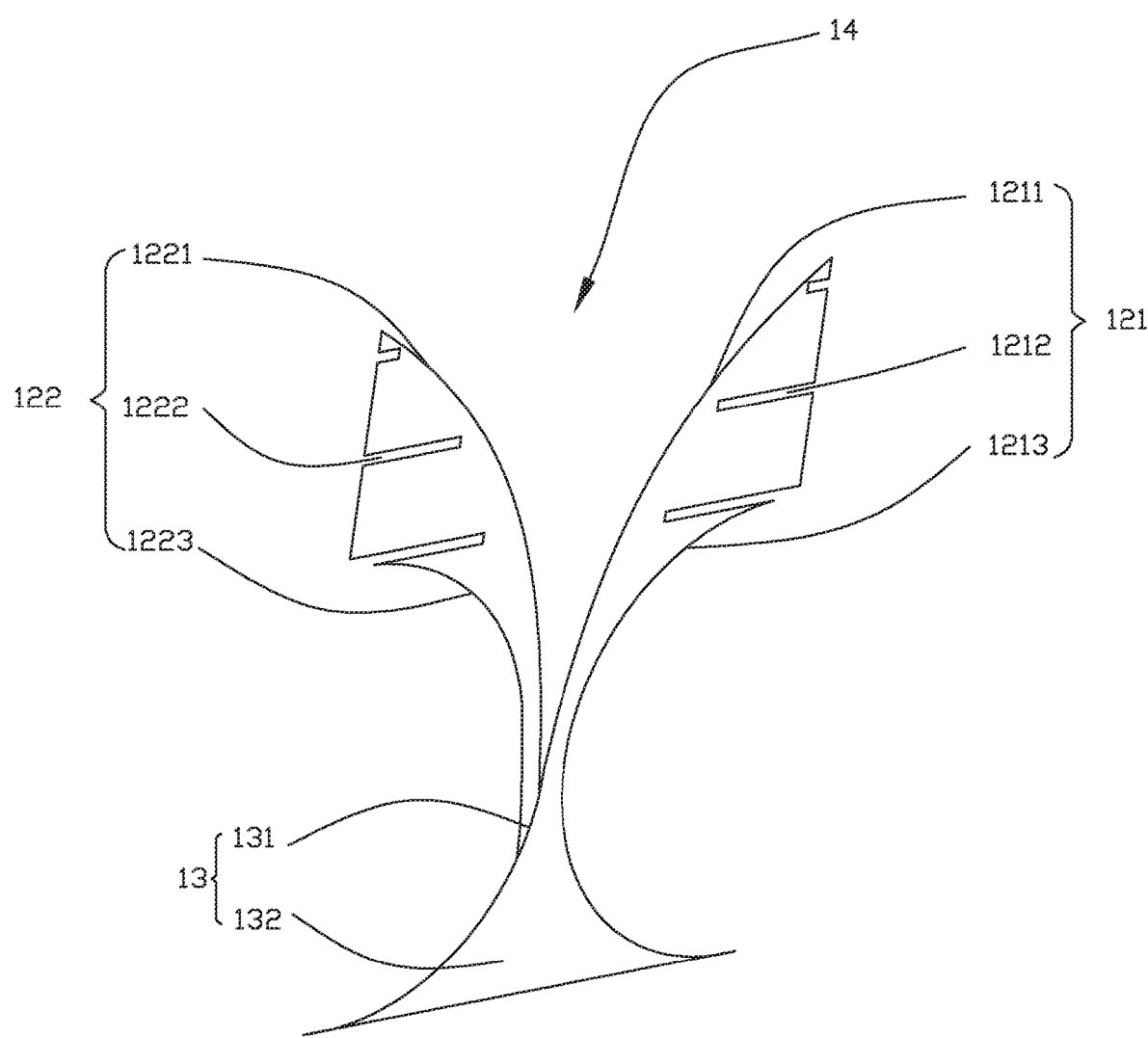
FIG. 3 is a perspective view showing the structure of the Vivaldi antenna provided by the present disclosure after removing a dielectric plate.
Figure 4:
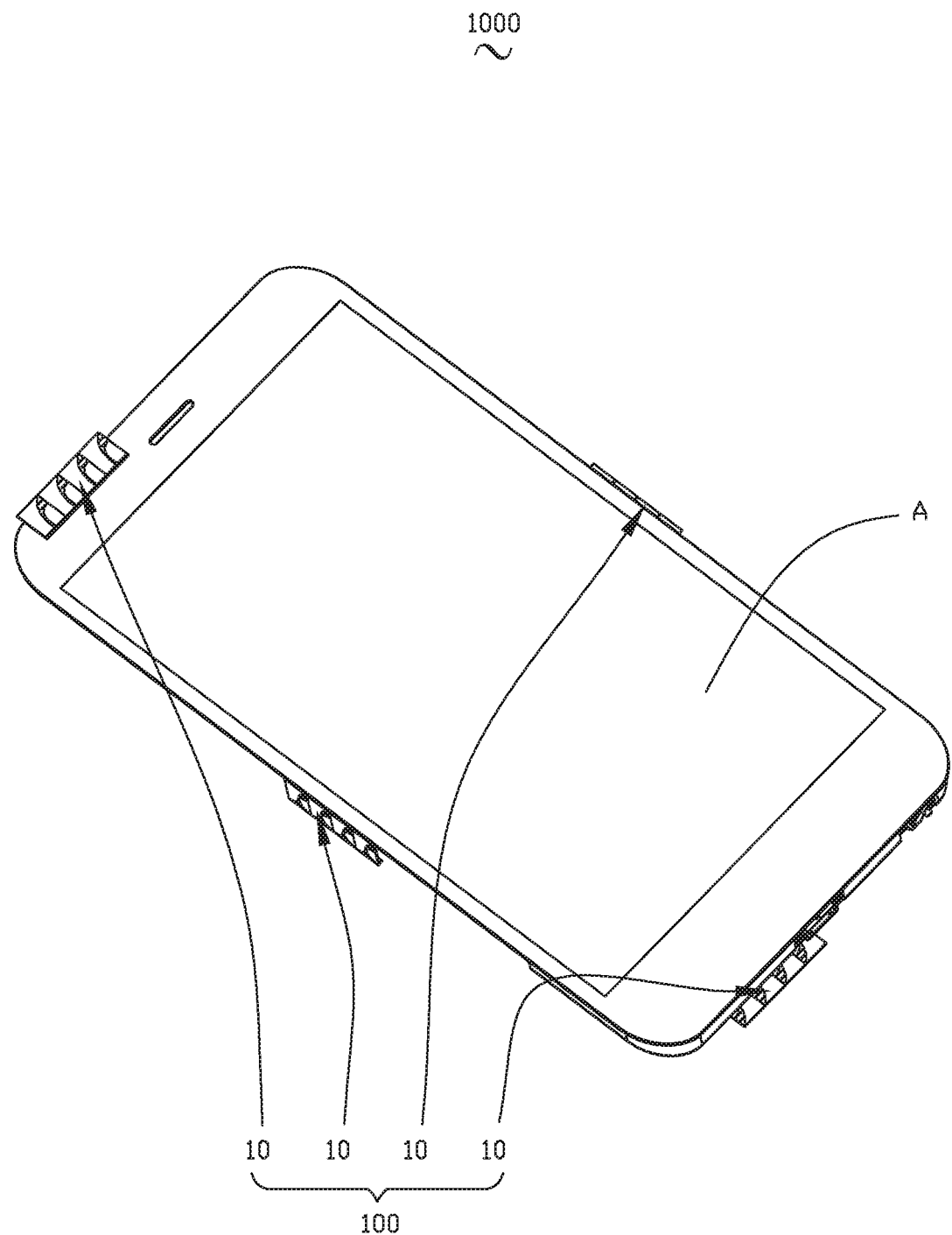
FIG. 4 is a perspective view showing the structure of a mobile terminal provided by the present disclosure.
Figure 5:
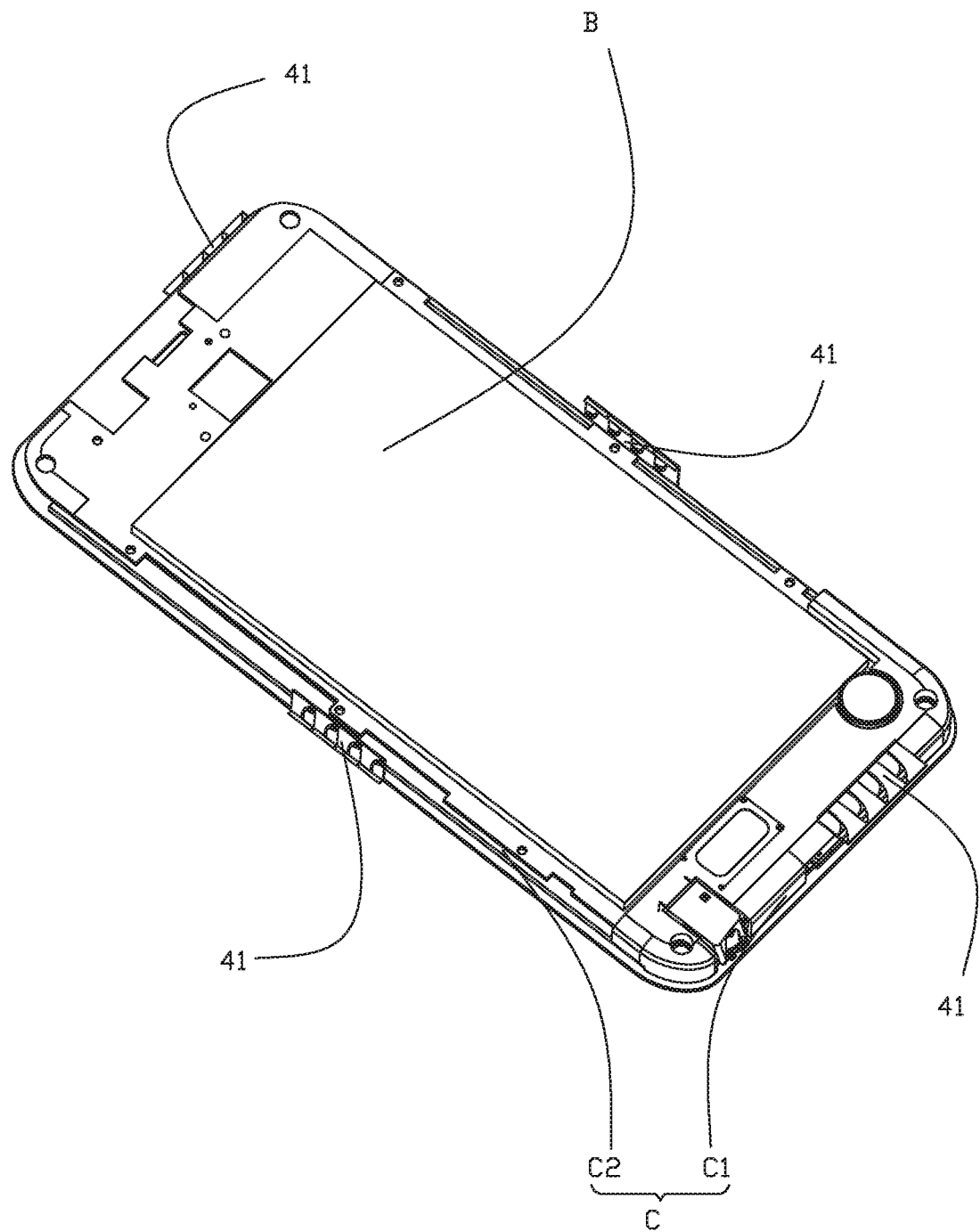
FIG. 5 is a perspective view showing the structure of the mobile terminal provided by the present disclosure from another angle.
Figure 6:
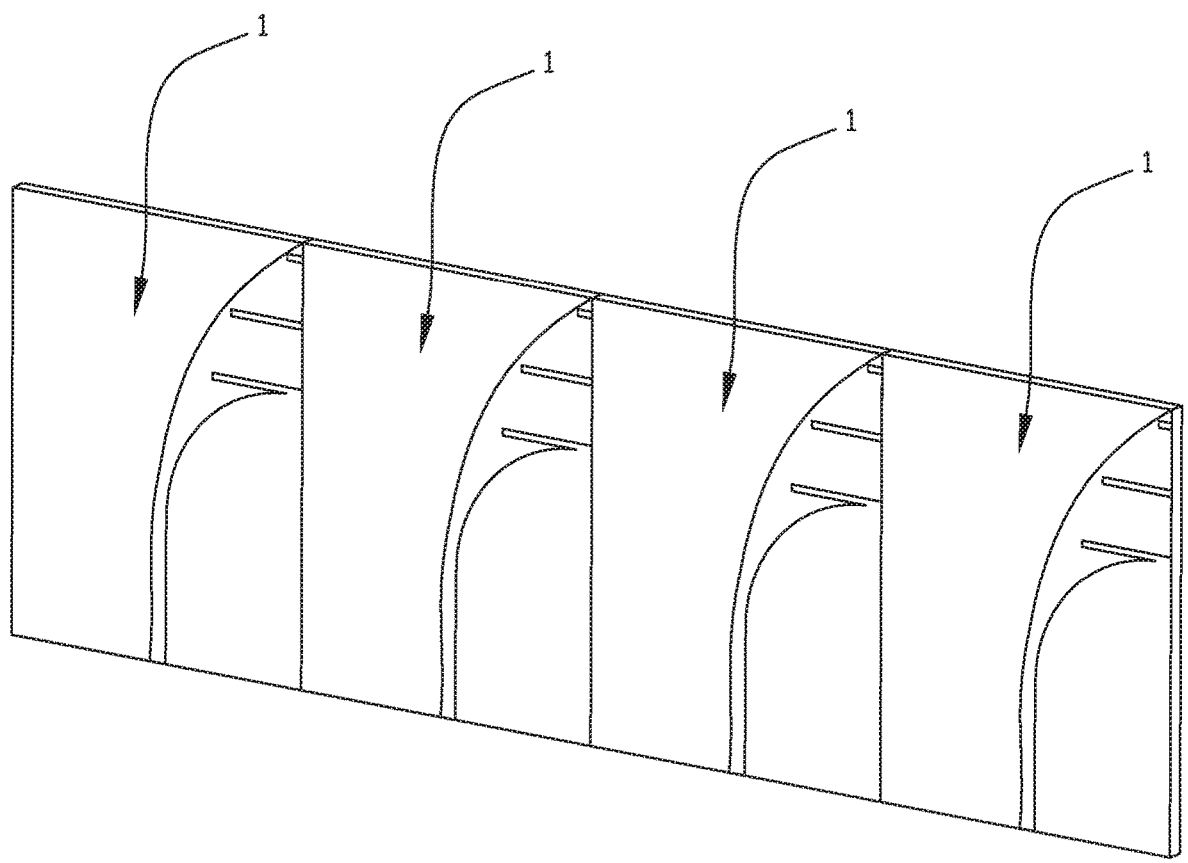
FIG. 6 is a perspective view showing the structure of a Vivaldi antenna array of the mobile terminal provided by the present disclosure.
Figure 7A:
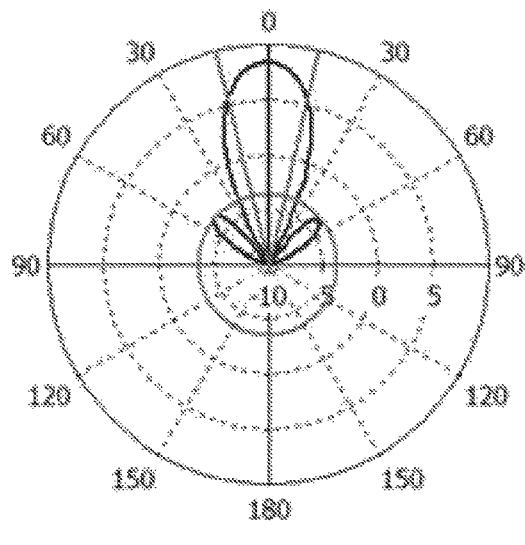
FIG. 7A is a radiation pattern of a first Vivaldi antenna array with a phase shift of 0° when the mobile terminal provided by the present disclosure is in a frequency band of 28 GHz.
Figure 7B:
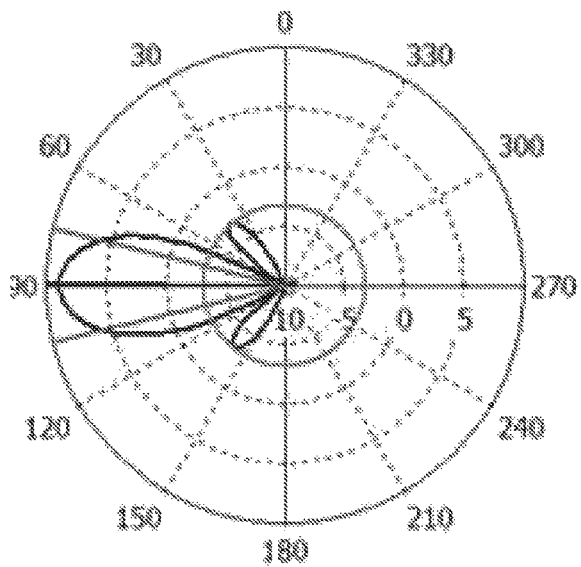
FIG. 7B is a radiation pattern of a second Vivaldi antenna array with a phase shift of 0° when the mobile terminal provided by the present disclosure is in the frequency band of 28 GHz.
Figure 7C:
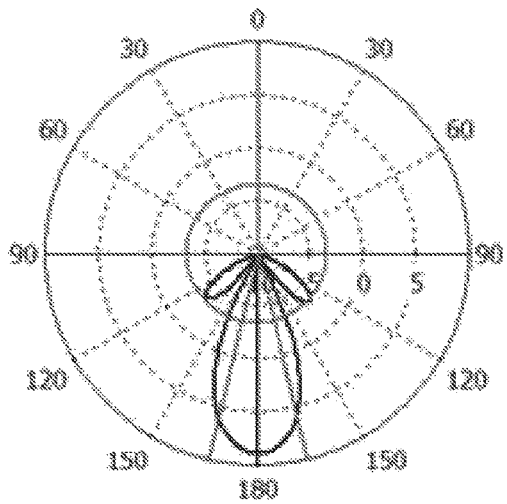
FIG. 7C is a radiation pattern of a third Vivaldi antenna array with a phase shift of 0° when the mobile terminal provided by the present disclosure is in the frequency band of 28 GHz.
Figure 7D:
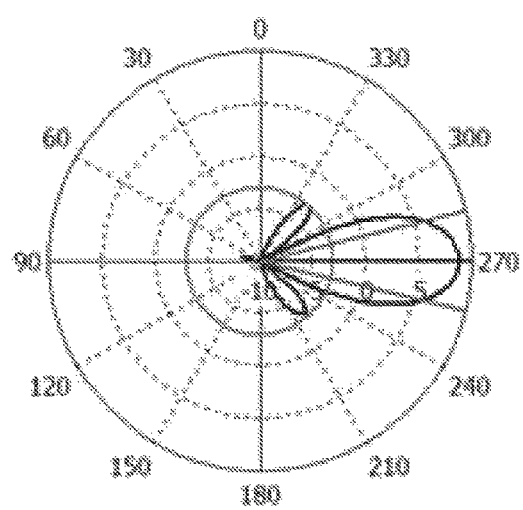
FIG. 7D is a radiation pattern of a fourth Vivaldi antenna array with a phase shift of 0° when the mobile terminal provided by the present disclosure is in the frequency band of 28 GHz.
Figure 8A:
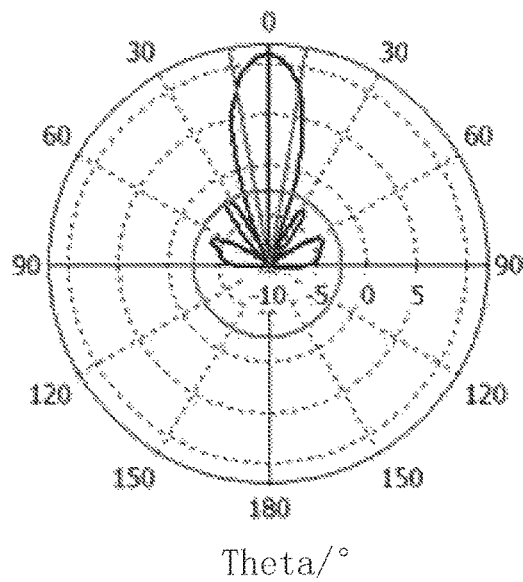
FIG. 8A is a radiation pattern of the first Vivaldi antenna array with a phase shift of 0° when the mobile terminal provided by the present disclosure is in a frequency band of 39 GHz.
Figure 8B:
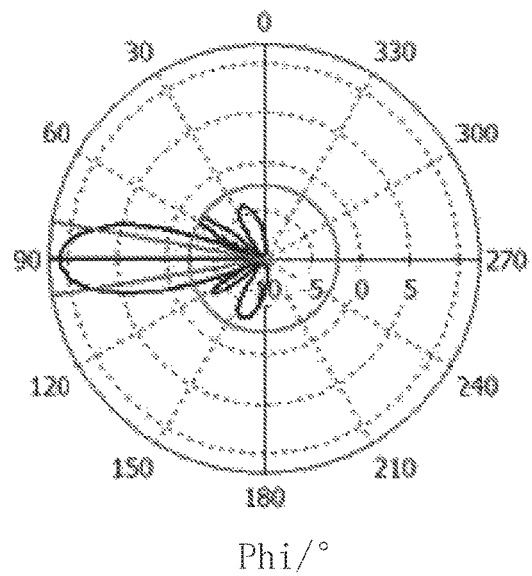
FIG. 8B is a radiation pattern of the second Vivaldi antenna array with a phase shift of 0° when the mobile terminal provided by the present disclosure is in a frequency band of 39 GHz.
Figure 8C:
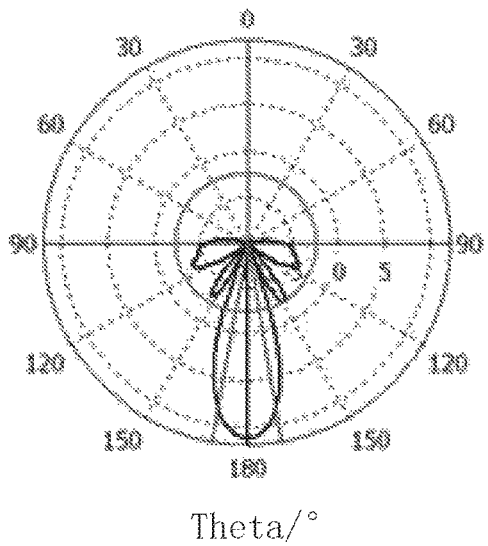
FIG. 8C is a radiation pattern of the third Vivaldi antenna array with a phase shift of 0° when the mobile terminal provided by the present disclosure is in a frequency band of 39 GHz.
Figure 8D:
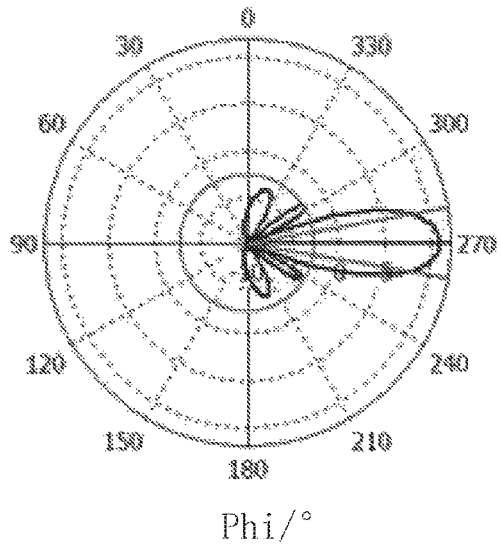
FIG. 8D is a radiation pattern of the fourth Vivaldi antenna array with a phase shift of 0° when the mobile terminal provided by the present disclosure is in a frequency band of 39 GHz.
Figure 9A:
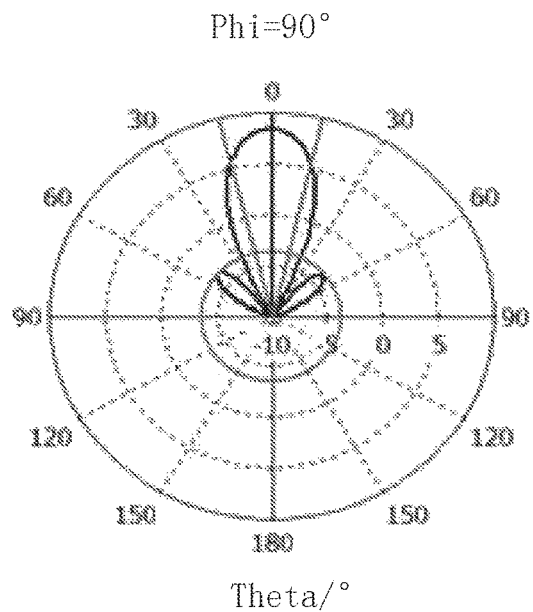
FIG. 9A is a radiation pattern of the first Vivaldi antenna array with a phase shift of 0° when the mobile terminal provided by the present disclosure is in a frequency band of 60 GHz.
Figure 9B:
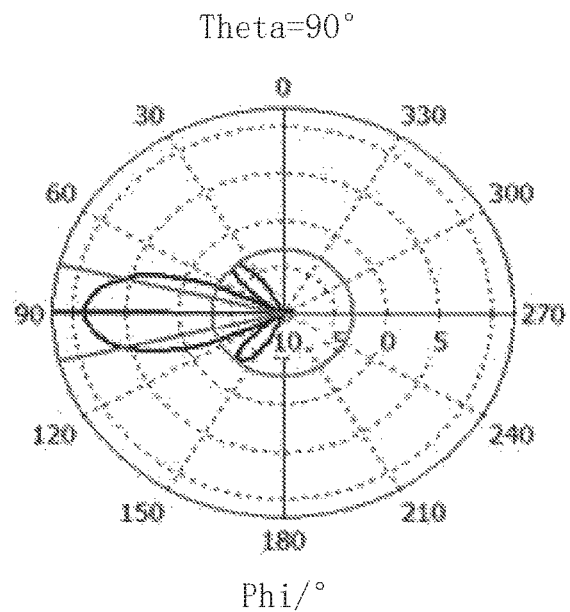
FIG. 9B is a radiation pattern of the second Vivaldi antenna array with a phase shift of 0° when the mobile terminal provided by the present disclosure is in a frequency band of 60 GHz.
Figure 9C:
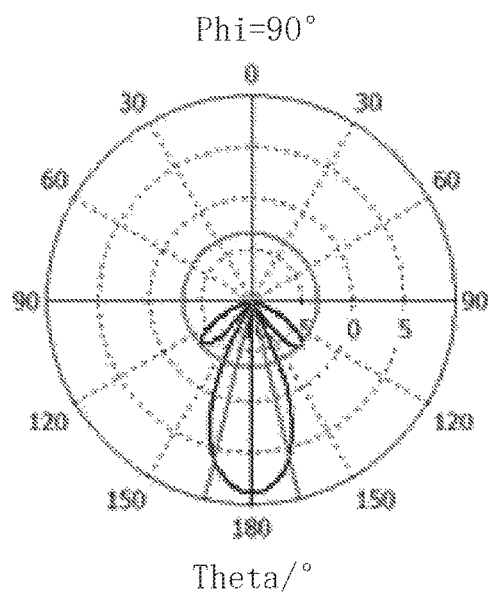
FIG. 9C is a radiation pattern of the third Vivaldi antenna array with a phase shift of 0° when the mobile terminal provided by the present disclosure is in a frequency band of 60 GHz.
Figure 9D:
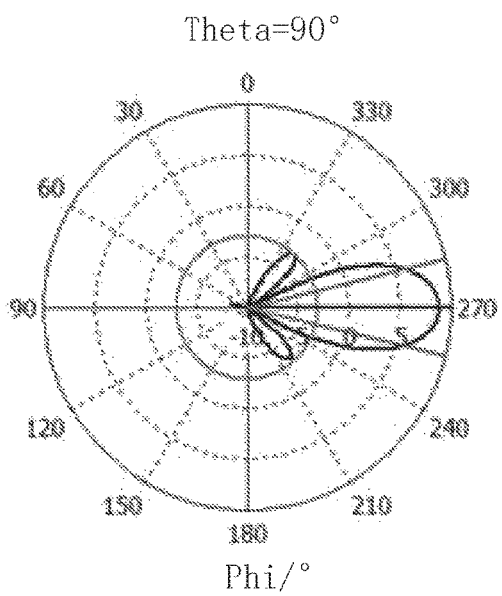
FIG. 9D is a radiation pattern of the fourth Vivaldi antenna array with a phase shift of 0° when the mobile terminal provided by the present disclosure is in a frequency band of 60 GHz.

The following clearly and completely describes the technical solutions in the embodiments of the present disclosure with reference to the accompanying drawings in the embodiments of the present disclosure. Apparently, the described embodiments are merely some but not all of the embodiments of the present disclosure. Based on the embodiments of the present disclosure, all other embodiments obtained by those having ordinary skills in the art without going through any creative work shall fall within the scope of protection of the present disclosure.

Referring to FIG. 1 to FIG. 6, the present disclosure provides a mobile terminal 1000. The mobile terminal 1000 can be a mobile phone, an IPAD or the like, and is illustrated by taking the mobile terminal being a mobile phone as an example. The mobile terminal 1000 includes a Vivaldi antenna system 100 arranged in the mobile terminal 1000, wherein the Vivaldi antenna system 100 includes two pairs of Vivaldi antenna arrays 10. Opening directions of one pair of the Vivaldi antenna arrays 10 are along a length direction of the mobile terminal 1000, opening directions of the other pair of the Vivaldi antenna arrays are along a thickness direction of the mobile terminal 1000, and each pair of the Vivaldi antenna arrays 10 includes two Vivaldi antenna arrays 10 with opposite opening directions. The Vivaldi antenna arrays 10 operate in a frequency band of 5G millimeter waves.

Specifically, the mobile terminal 1000 includes a first surface A and a second surface B arranged oppositely along the thickness direction of the mobile terminal 1000, and a side wall surface C connecting the first surface A and the second surface B.

The side wall surface C includes two oppositely arranged first side wall surfaces C1, and two oppositely arranged second side wall surfaces C2 which are respectively connected with the two first side wall surfaces C1. The first side wall surface C1 extends along a width direction of the mobile terminal 1000, and the second side wall surface C2 extends along the length direction of the mobile terminal 1000.

The two Vivaldi antenna arrays 10 are respectively attached to the two second side wall surfaces C2 with the opening directions respectively facing towards the first surface A and the second surface B, and the other two Vivaldi antenna arrays 10 are respectively attached to the first surface A and the second surface B with the opening directions respectively facing towards the two first side wall surfaces C1.

By attaching the foregoing Vivaldi antenna array 10 in a linear array instead of a planar array in the mobile terminal 1000, on one hand, the space occupied by the millimeter wave array in the mobile phone is narrowed, and the design difficulty, the test difficulty and the complexity of beam management are simplified; and, on the other hand, excellent spatial coverage efficiency can be realized due to the wide and uniform beam bandwidths of the 1×4 linear array in a non-scanning direction.

Further, each of the Vivaldi antenna arrays 10 includes a plurality of Vivaldi antennas 1 arranged in a linear array. In this embodiment, each of the Vivaldi antenna arrays 10 is composed of four Vivaldi antennas 1. Of course, in other embodiments, the Vivaldi antenna arrays 10 may be composed of three, five or six Vivaldi antennas 1.

The Vivaldi antenna 1 includes a dielectric plate 11, a radiation portion 12 attached to the dielectric plate 11, and a power feeder 13 attached to the dielectric plate 11.

In this embodiment, the dielectric plate 11 is rectangular, and the dielectric plate 11 has a size of 5.2 mm×6.8 mm×0.254 mm.

The radiation portion 12 includes a first gradient arm 121 attached to one surface of the dielectric plate 11 and a second gradient arm 122 attached to the other surface of the dielectric plate 11. The second gradient arm 122 and the first gradient arm 121 are in mirror symmetry, and orthographic projections of the first gradient arm 121 and the second gradient arm 122 on the dielectric plate 11 are matched to form a horn-shaped opening 14.

Specifically, the first gradient arm 121 includes a first gradient line 1211 matching to form the opening, a second gradient line 1213 spaced apart from the first gradient line 1211, a first connecting line connecting the first gradient line 1211 and the second gradient line 1213, and at least two first grating grooves 1212 extending from the first connecting line towards the first gradient line 1211.

The second gradient arm 122 includes a third gradient line 1221 matching to form the opening 14, a fourth gradient line 1223 spaced apart from the third gradient line 1221, a second connecting line connecting the third gradient line 1221 and the fourth gradient line 1223, and at least two second grating grooves 1222 extending from the second connecting line towards the third gradient line 1221.

The power feeder 13 includes a microstrip line 131 attached to one surface of the dielectric plate 11 and a ground plane 132 attached to the other surface of the dielectric plate 11. An orthographic projection of the microstrip line 131 on a surface on which the ground plane 132 is located falls into the ground plane 132, one of the microstrip line 131 and the ground plane 132 is connected with the first gradient arm 121, and the other one of the microstrip line 131 and the ground plane 132 is connected with the second gradient arm 122.

Specifically, the dielectric plate 11 of the Vivaldi antenna 1 attached to the second side wall surface C2 is opposite to the second side wall surface C2, the dielectric plate 11 of the Vivaldi antenna 1 attached to the first surface A is opposite to the first surface A, and the dielectric plate 11 of the Vivaldi antenna 1 attached to the second surface B is opposite to the second surface B.

A surface on which the microstrip line 131 is located is close to an external space of the mobile terminal 1000, and a surface on which the ground plane 132 is located is close to an internal space of the mobile terminal 1000.

Referring to FIGS. 7A to 7D, FIGS. 8A to 8D, and FIGS. 9A to 9D, it can be seen that the mobile terminal 1000 realizes full-space coverage by using four Vivaldi antenna arrays 10.

Figure 10:
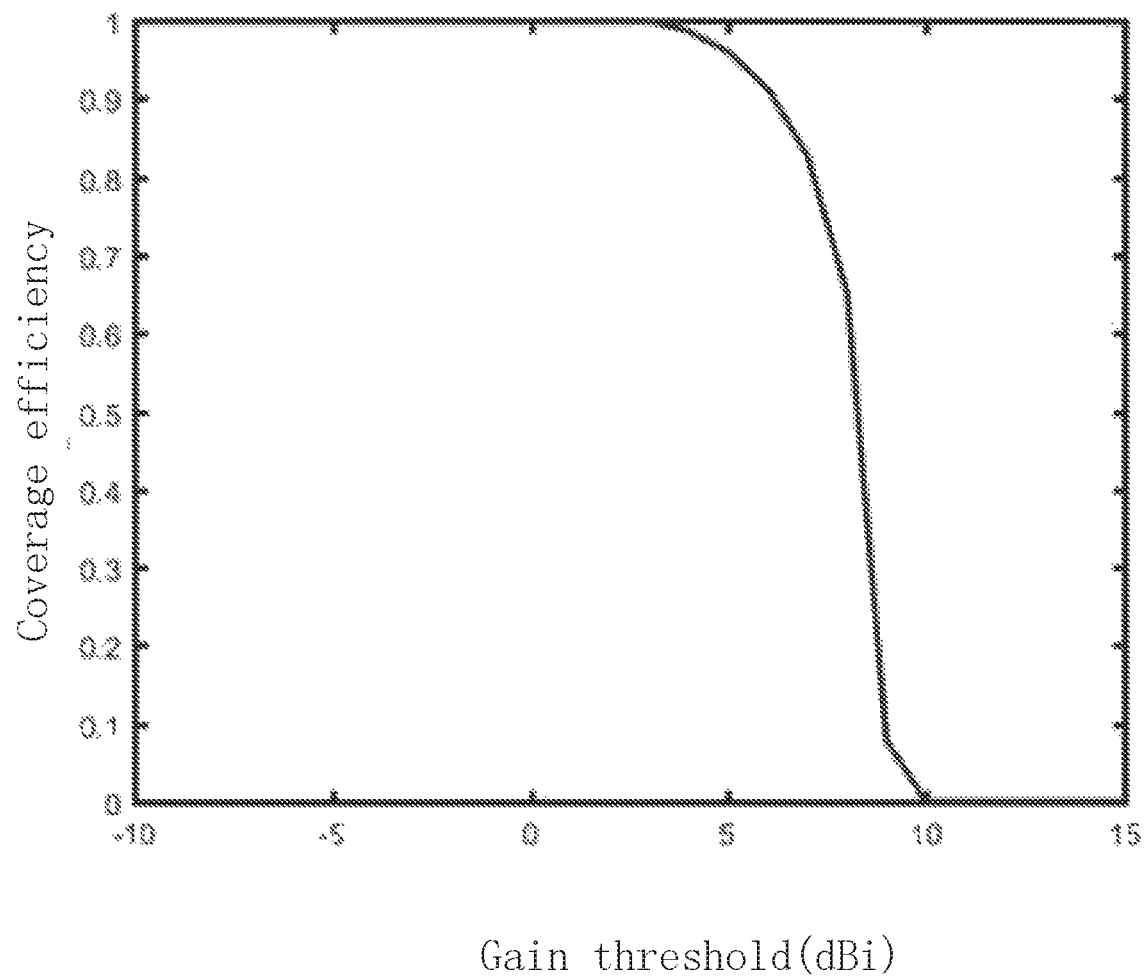
FIG. 10 is a coverage efficiency curve of the mobile terminal provided by the present disclosure in the frequency band of 28 GHz.
Figure 11:
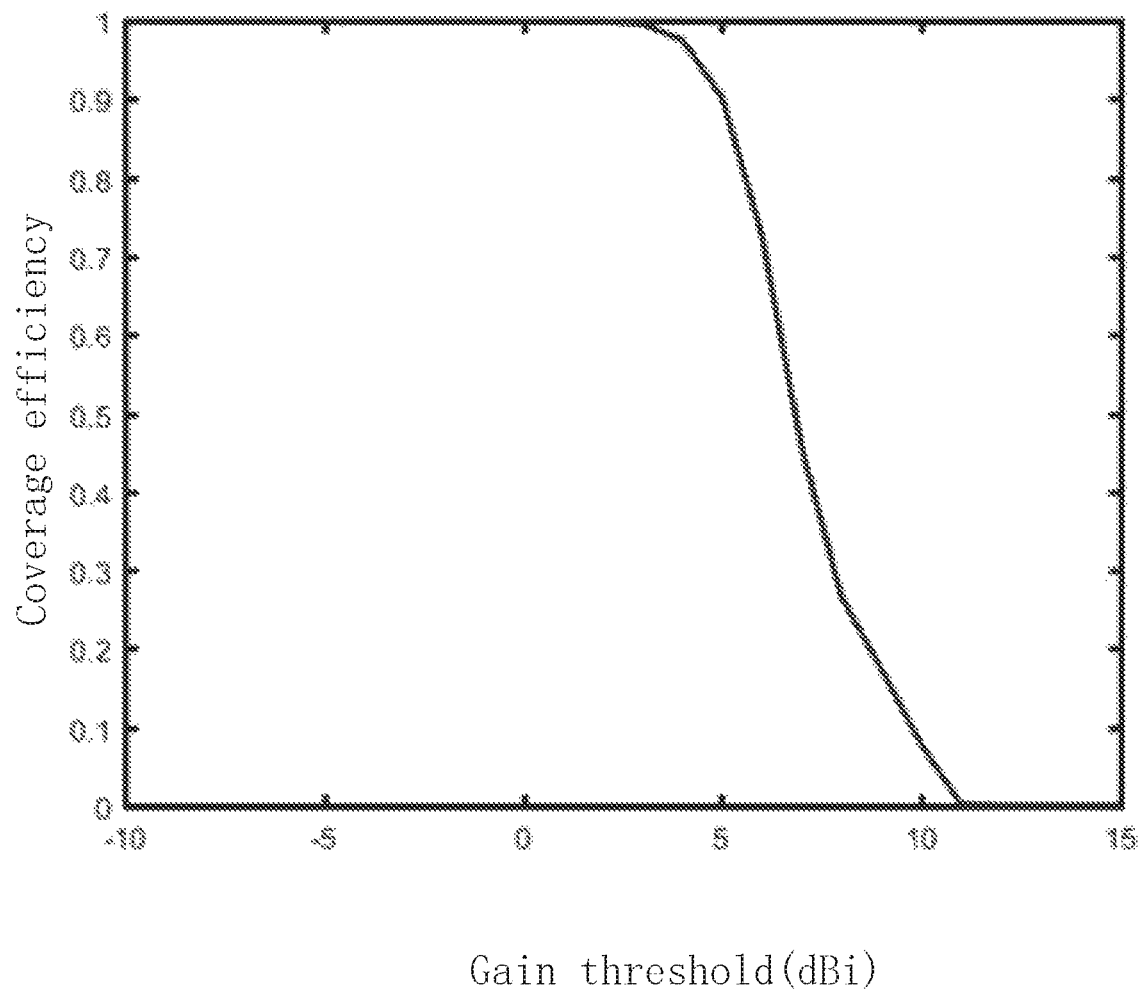
FIG. 11 is a coverage efficiency curve of the mobile terminal provided by the present disclosure in the frequency band of 39 GHz.
Figure 12:
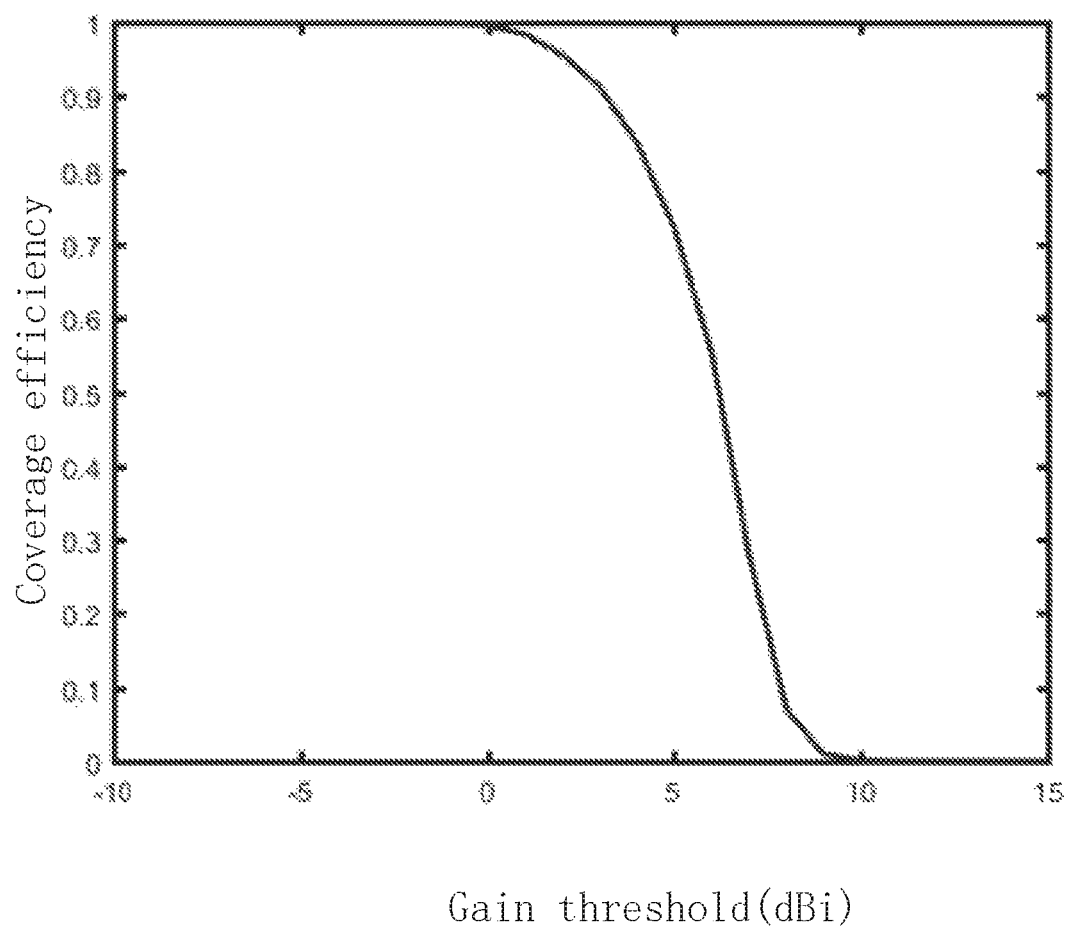
FIG. 12 is a coverage efficiency of the mobile terminal provided by the present disclosure in the frequency band of 60 GHz.

Referring to FIGS. 10 to 12, it can be seen that high frequency coverage efficiency of the mobile terminal 1000 can be realized by using the Vivaldi antenna array 10.

Compared with the related art, the Vivaldi antenna array 10 according to the present disclosure adopts a linear array instead of a planar array, which, on one hand, narrows the space occupied by the millimeter wave array in the mobile phone, and simplifies the design difficulty, the test difficulty and the complexity of beam management, and, on the other hand, can realize excellent spatial coverage efficiency due to the wide and uniform beam bandwidths of the 1×4 linear array in a non-scanning direction. The Vivaldi antenna 1 can cover the 5G frequency bands of millimeter waves such as 28 GHz, 39 GHz and the like, and also covers a WIFI frequency band of millimeter waves at 60 GHz, and space is saved due to the fact that one antenna is shared in multiple frequency bands; therefore, the Vivaldi antenna 1 has excellent coverage efficiency at 28 GHz, 39 GHz and 60 GHz.

The description above is merely embodiments of the present disclosure, and it should be pointed out that, those of ordinary skills in the art can make improvements without departing from the inventive concept of the present disclosure, but these all belong to the scope of protection of the present disclosure.

What is claimed is:

1. A mobile terminal, comprising a Vivaldi antenna system arranged in the mobile terminal; wherein
    the Vivaldi antenna system comprises two pairs of Vivaldi antenna arrays;
    opening directions of one pair of the Vivaldi antenna arrays are along a length direction of the mobile terminal, and opening directions of the other pair of the Vivaldi antenna arrays are along a thickness direction of the mobile terminal;
    each pair of the Vivaldi antenna arrays comprises two Vivaldi antenna arrays with opposite opening directions;
    the Vivaldi antenna arrays are configured to operate in a frequency band of 5G millimeter waves.

2. The mobile terminal according to claim 1, comprising:
    a first surface and a second surface oppositely arranged along the thickness direction of the mobile terminal; and
    a side wall surface connecting the first surface and the second surface;
    wherein the side wall surface comprises:
        two first side wall surfaces that are oppositely arranged; and
        two second side wall surfaces that are oppositely arranged and respectively connected with the two first side wall surfaces;
    the first side wall surfaces extend along a width direction of the mobile terminal, the second side wall surfaces extend along the length direction of the mobile terminal; the two Vivaldi antenna arrays are respectively attached to the two second side wall surfaces with the opening directions respectively facing towards the first surface and the second surface, and the other two Vivaldi antenna arrays are respectively attached to the first surface and the second surface with the opening directions respectively facing towards the two first side wall surfaces.

3. The mobile terminal according to claim 1, wherein each of the Vivaldi antenna arrays comprises a plurality of Vivaldi antennas arranged in a linear array.

4. The mobile terminal according to claim 3, wherein the Vivaldi antenna comprises:
    a dielectric plate; and
    a radiation portion attached to the dielectric plate;
    the radiation portion comprises:
        a first gradient arm attached to one surface of the dielectric plate; and
        a second gradient arm attached to the other surface of the dielectric plate;
    the second gradient arm and the first gradient arm are in mirror symmetry, and orthographic projections of the first gradient arm and the second gradient arm on the dielectric plate are matched to form a horn-shaped opening.

5. The mobile terminal according to claim 4, wherein the first gradient arm comprises:
    a first gradient line matching to form the opening;
    a second gradient line spaced apart from the first gradient line; and
    a first connecting line connecting the first gradient line and the second gradient line;
    the first gradient arm further comprises at least two first grating grooves extending from the first connecting line towards the first gradient line;
    the second gradient arm comprises:
        a third gradient line matching to form the opening;
        a fourth gradient line spaced apart from the third gradient line; and
        a second connecting line connecting the third gradient line and the fourth gradient line;
    the second gradient arm further comprises at least two second grating grooves extending from the second connecting line towards the third gradient line.

6. The mobile terminal according to claim 4, wherein the Vivaldi antenna further comprises: a power feeder attached to the dielectric plate;
    the power feeder comprises:
        a microstrip line attached to one surface of the dielectric plate; and
        a ground plane attached to the other surface of the dielectric plate;
    an orthographic projection of the microstrip line on a surface on which the ground plane is located falls into the ground plane;
    one of the microstrip line and the ground plane is connected with the first gradient arm, and the other one of the microstrip line and the ground plane is connected with the second gradient arm.

7. The mobile terminal according to claim 6, wherein the dielectric plate of the Vivaldi antenna attached to the second side wall surface is opposite to the second side wall surface, the dielectric plate of the Vivaldi antenna attached to the first surface is opposite to the first surface, and the dielectric plate of the Vivaldi antenna attached to the second surface is opposite to the second surface.

8. The mobile terminal according to claim 7, wherein a surface on which the microstrip line is located is close to an external space of the mobile terminal, and the surface on which the ground plane is located is close to an internal space of the mobile terminal.

* * * * *